Figure 1:
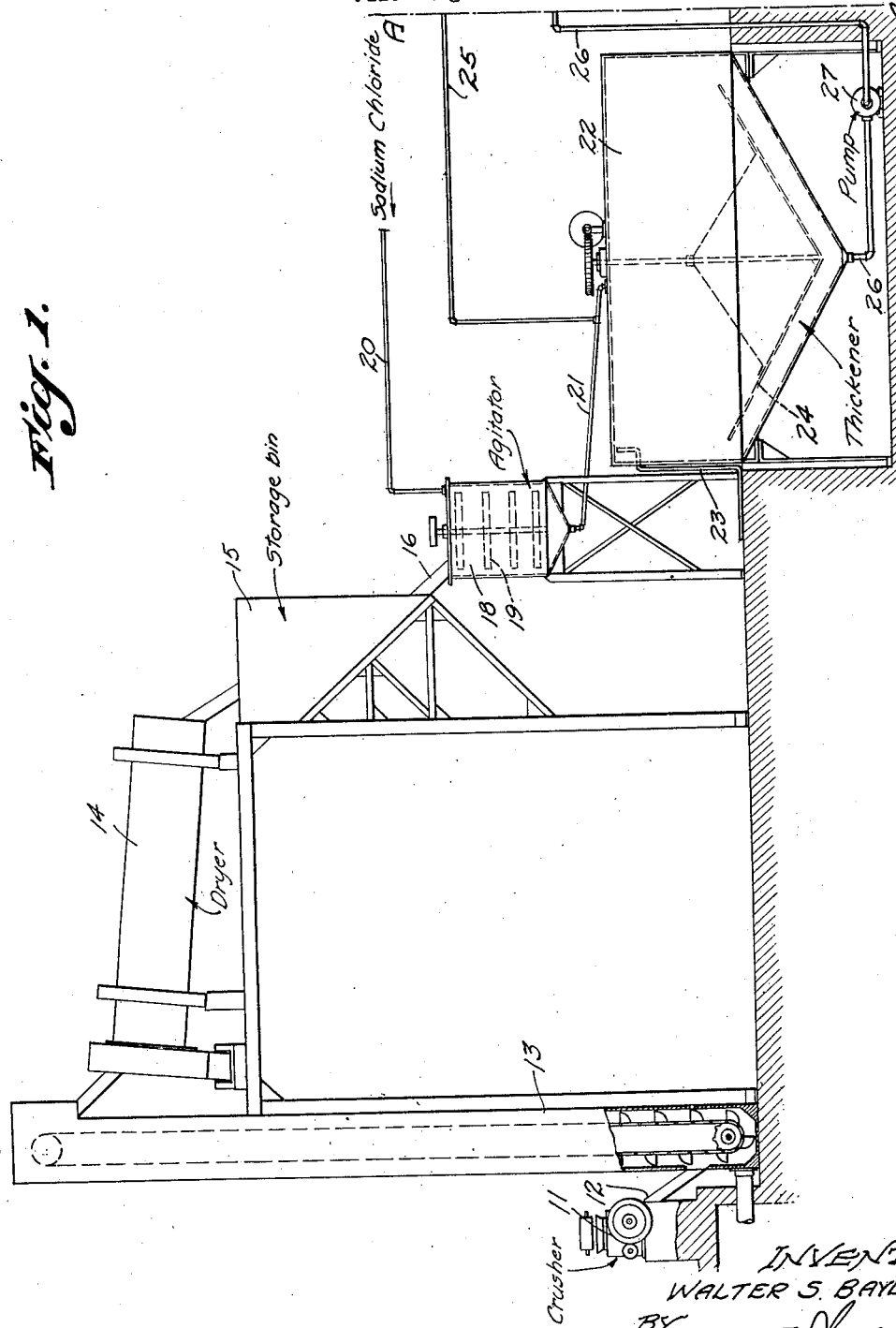

Aug. 11, 1931.  W. S. BAYLIS  1,818,453
PROCESS OF MAKING CHEMICALLY TREATED ACTIVATED ADSORBENT MATERIAL
Filed Aug. 30, 1927  4 Sheets-Sheet 1

Aug. 11, 1931.  W. S. BAYLIS  1,818,453
PROCESS OF MAKING CHEMICALLY TREATED ACTIVATED ADSORBENT MATERIAL
Filed Aug. 30, 1927  4 Sheets-Sheet 2

INVENTOR:
WALTER S. BAYLIS
BY
ATTORNEY.

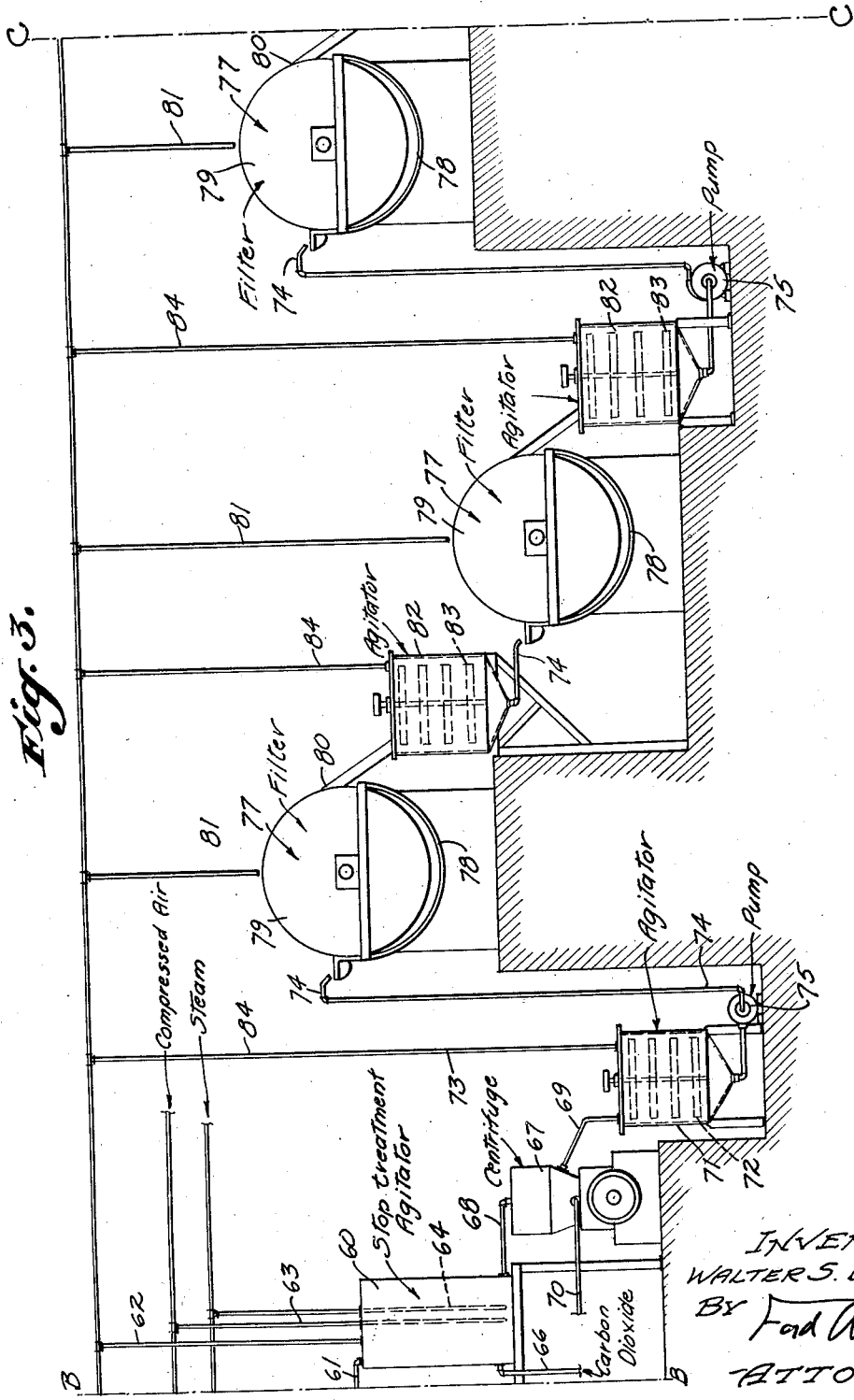

Aug. 11, 1931.　　　W. S. BAYLIS　　　1,818,453
PROCESS OF MAKING CHEMICALLY TREATED ACTIVATED ADSORBENT MATERIAL
Filed Aug. 30, 1927　　　4 Sheets-Sheet 4
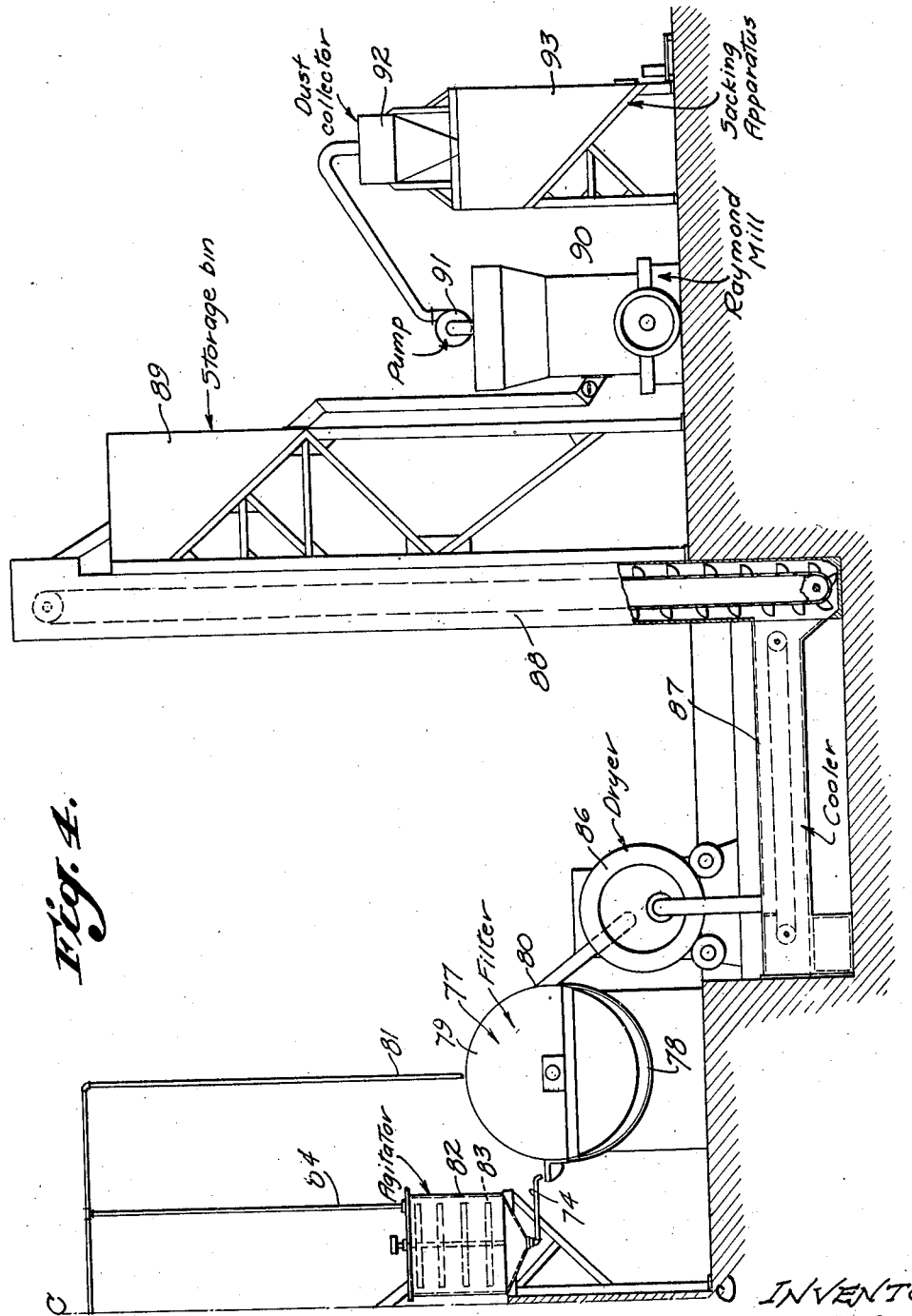

Patented Aug. 11, 1931

1,818,453

UNITED STATES PATENT OFFICE

WALTER S. BAYLIS, OF LOS ANGELES, CALIFORNIA, ASSIGNOR, BY MESNE ASSIGNMENTS, TO FILTROL COMPANY, OF CALIFORNIA, A CORPORATION OF CALIFORNIA

PROCESS OF MAKING CHEMICALLY TREATED ACTIVATED ADSORBENT MATERIAL

Application filed August 30, 1927. Serial No. 216,350.

My invention relates to adsorbent clays, such as fuller's-earth, and particularly to a chemically treated activated adsorbent mineral which is useful in many industries for removing impurities from liquids or gases.

Almost all raw clay from which the activated adsorbent mineral is made contains lime in some form. This lime is not usually present in the form of lime oxide CaO, but in the form of calcium carbonate $CaCO_3$, and silicate of lime $CaSiO_3$. It has been my experience that this lime is quite difficult to remove from the clay and consequently the activated adsorbent mineral manufacturer does not completely remove this lime. Experiments have shown that an activated adsorbent mineral having no lime content is at least 30% more efficient than activated adsorbent material having a lime content.

It is one of the important objects of this invention to provide a method of making activated adsorbent mineral which is free from lime or lime salts.

In the ordinary method of manufacture of activated adsorbent mineral the raw clay is first acid treated and then washed to remove the impurities which have been freed from the clay. I have found that if the lime has not been throughly removed from the clay, the clay will during washing very slowly give up the acid which has combined with it. This results in instability and reversions, and prevents a uniform reactivation of the used activated adsorbent mineral.

It is one of the objects of my invention to provide a method of making activated adsorbent mineral which will not give up the combined acid during the process of manufacture.

A further object of the invention is to provide an activated adsorbent mineral which will be stable and which may be reactivated uniformly to a high efficiency.

I have found that a better activated adsorbent mineral may be produced if all of the lime or at least a very large percentage of the lime content is removed from the raw clay before it is subjected to the acid treatment.

It is accordingly one of the objects of this invention to provide a method of making an activated adsorbent mineral in which the lime is removed before the clay is acid treated.

Experiments have shown that the treatment of the raw mineral is more effective if it is completely dry before it is acted upon.

It is therefore an object of this invention to provide a method of producing activated adsorbent mineral in which the raw clay is completely dried before subjected to further steps in the method.

I have found through extensive research and experiments that a superior activated adsorbent mineral may be produced if the raw clay is treated with acid to a certain extent and no more; and that if the certain limit is exceeded, the product will not have the desired qualities.

It is one of the objects of the invention to provide a method of making activated adsorbent mineral in which the action of the acid is quickly stopped when the clay has been treated to a certain degree.

I have further found that a better and more uniform activated adsorbent mineral may be made if the raw clay is successively treated with different amounts of acid.

It is one of the objects of this invention to provide a method of making activated adsorbent mineral in which the raw clay is successively subjected to the action of acid treatments of different amounts of acid.

Other objects and advantages will appear in the following description.

Figure 2:
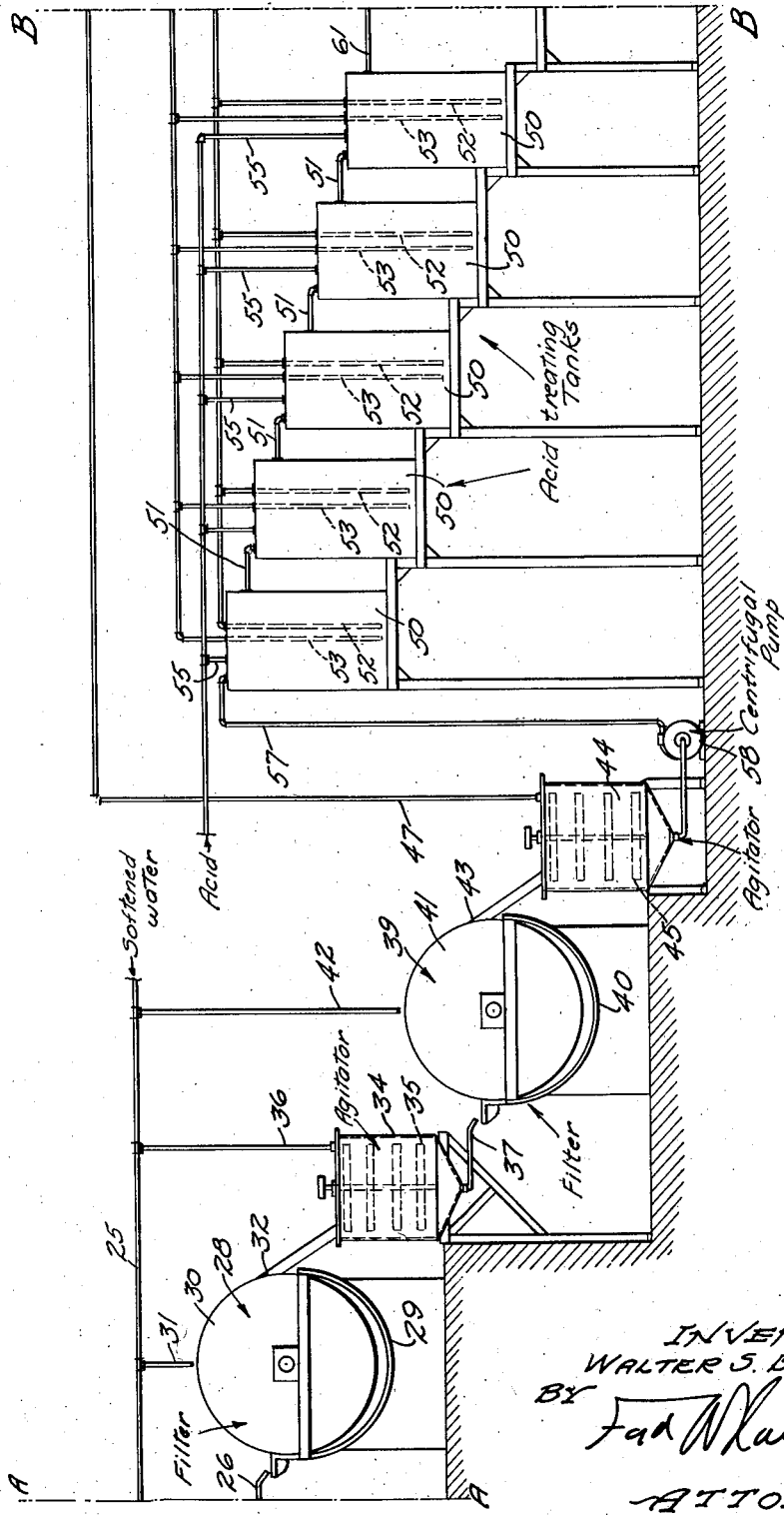

My invention may be conducted by using various types of apparatus which are capable of performing functions which are necessary. In the following description of the invention, reference will be had to the accompanying drawings in which an apparatus is diagrammatically illustrated. Figs. 1 to 4 of the drawings represent the entire apparatus, and in reference to the drawings Fig. 1 should be placed at the left end and Fig. 4 should be placed at the right end. The pairs of vertical lines A—A, B—B, an C—C should be placed adjacent to each other. The different units of this apparatus can all be purchased on the market and are well known in the industry. For this reason the diagrammatic drawings will be sufficient, since anyone versed in the art will readily understand the apparatus.

The raw clay is first mined, being preferably broken up into lumps of about walnut size or smaller. This mined raw clay is first aged or weathered by exposing it to the atmosphere and sun for a period of time. This aging process produces some change in the raw clay which is not thoroughly understood. I find, however, that by aging the raw clay I am enabled to secure more definite and uniform results. The longer the clay is aged, the better the results in respect to the adsorptive qualities of the final product. I prefer to age the raw clay for at least thirty days.

After aging, the clay is transported to the apparatus diagrammatically shown in the drawings, and the remainder of the process of producing the activated adsorbent mineral is carried on. The raw clay in lump form is delivered to a crusher 11 in which the raw clay is finely divided. This ray clay passes from the crusher 11 through a chute 12 to an elevator 13, by means of which it is delivered to a drier 14. In this drier 14 the clay is subjected to a heat treatment which seems to make it more succeptible to the following steps in the process. The clay is preferably heated to a temperature above the boiling point of water and below the sintering point of the clay. In this manner the clay is thoroughly dried. The dry clay is delivered from the drier 14 to a storage bin 15.

The next step in the process is to treat the clay with a brine solution. The clay is delivered through a conduit 16 to an agitator 18 having an agitating means 19 therein. This clay is thoroughly agitated with a brine solution which is a solution of sodium chloride supplied thereto by means of a pipe 20. Different grades of clay will require different proportions and concentrations of brine, and anyone skilled in the art will be able to readily determine the desired proportions and concentrations. The brine solution and the clay are thoroughly mixed together until the brine solution has thoroughly removed the lime or lime salts from the pores of the clay.

The mixture of clay and brine solution is delivered through a conduit 21 to a thickener 22 or other suitable apparatus for separating the brine solution from the clay. The clay tends to settle to the bottom of the thickener 22, and the brine solution to the top, being withdrawn through a pipe 23. In the thickener 22 the mixture of clay and brine solution is agitated by an agitator 24 and simultaneously therewith softened water is introduced through a pipe 25. I prefer to use softened water because softened water has no lime content which would tend to deposit its lime in the clay and thus tend to defeat the purpose of this step of the process. The concentration of the brine solution is gradually reduced so that there is but a slight trace of salt in the mixture. A greater portion of the lime and lime salts are carried from the clay through the pipe 23.

The washing action of the clay which takes place in the thickener 22 does not entirely remove all traces of the brine and lime or lime salts from the clay. It is very essential that all traces be removed. This partly washed clay is delivered through a conduit 26 to a rotary filter 28 by means of a pump 27 in the conduit 26. The rotary filter 28 may be the standard Oliver filter, well known in the industry. This filter 28 includes a tank 29 into which the clay is delivered. The clay is drawn onto the drum 30 of the filter 28 and all of the moisture is removed therefrom by a vacuum on the interior of the drum. Softened water is sprayed onto the cake formed on the drum 30 by means of a pipe 31. This softened water washes the cake very thoroughly. The cake is then removed by a scraper 32 and is delivered to an agitator 34 having an agitating means 35. The clay in the agitator 34 is thoroughly mixed with softened water added thereto by a pipe 36. After this washing action in the agitator 34, the mixture of clay and softened water is delivered through a conduit 37 to a second Oliver filter 39. This second Oliver filter 39 has a tank 40 into which the mixture is delivered and a drum 41 on which a cake is formed. The moisture is withdrawn from the cake by a vacuum, and the cake is sprayed with softened water by a pipe 42. The dry cake is removed from the drum 41 by a scraper 43 and is delivered to a second agitator 44 having an agitating means 45. The clay is at this time thoroughly mixed by the action of the agitating means 45 with a hot softened water introduced through a pipe 47. I prefer to use hot water at this point in the process but cold softened water may be used with slightly inferior results.

When the clay has been treated to the extent described, about 95% of the lime or lime salts originally contained in the raw clay has been removed. When a clay has but a small lime content, the action of the sulphuric acid is such as to produce a better product.

The next step in the process is to acid-treat the clay with sulphuric acid. The acid-treating apparatus illustrated consists of a series of treating tanks 50 which are connected together by conduits 51 in such a manner that the overflow from one tank will pass into the next succeeding tank. Each tank is provided with a pipe 52 for introducing steam thereinto, a pipe 53 for introducing agitating air thereinto, and a pipe 55 for introducing acid.

The clay is forced through a conduit 57 from the agitator 44 to the first tank 50 by means of a centrifugal pump 58. In the first tank 50 a certain amount of acid (preferably $H_2SO_4$) is added to the clay, which clay has softened water mixed with it, and is heated by steam introduced into the tank by the pipe 52. At the same time, compressed air is supplied through the pipe 53 and the mixture of clay, water, and acid is thoroughly agitated. The steam tends to boil the mixture, and it is found that this boiling action increases the effectiveness of the acid. After treatment in the first tank for a short period of time the mixture is overflowed into the second tank where it is mixed with a fresh supply of acid. Treatment is carried on in this second tank for a certain length of time and the mixture is then passed to the third tank. In the diagrammatic sketch, five acid-treating tanks are illustrated. Each succeeding tank is preferably hotter than the preceding tank, and in each succeeding tank the mixture is preferably mixed with a larger amount of acid. This is found to be the most effective way of acid-treating the clay and is found to produce the best product. The clay usually passes through the acid-treating tanks 50 in seven to nine hours. The action of the acid on the clay is to remove from the pores of the clay certain undesirable substances such as aluminum oxide, magnesium oxide, etc., converting these oxides into soluble salts so that they may be washed out. If there is any lime in the clay at this time, this lime will be converted into calcium sulphate which is an inactive substance. It will be seen that if the clay is not treated enough, all of these oxides and lime will not be removed from the clay.

As pointed out in the statement of invention the clay must not be over-treated. By properly gauging the time and proportioning the amount of acid added during the acid treatment, the clay will be treated to the limit when it passes from the last tank 50.

The next step in the process is to quickly stop the acid action so as to prevent over-treatment of the clay. This is accomplished in a stop-treatment agitator 60 to which the treated clay is delivered by a conduit 61. The clay is mixed with hot softened water supplied to the stop-treatment agitator by a pipe 62 and is thoroughly and violently agitated by compressed air supplied through a pipe 63. Steam is supplied to the agitator 60 through a pipe 64 and the mixture of clay and hot softened water is boiled during agitation. This treatment is effective in completely stopping the action of the sulphuric acid, and the clay will not be over-treated.

The lime which is converted into calcium sulphate is first converted into a flocculent or amorphous condition, and if it is washed out while in this form or condition, it can be more readily and more thoroughly removed than if it is allowed to crystallize into an absolute calcium sulphate which is not readily soluble either in hot or cold water. I find it advantageous to charge the washing water of the stop-treatment agitator 60 with a suitable fixing medium, such as carbon dioxide $CO_2$, which may be introduced through a pipe 66. The carbon dioxide fixes the lime in a flocculent state and prevents crystallization.

It is very essential to the method that the acid liquor be removed from the clay as quickly as possible after the stopping action. This quick separation is best accomplished by means of a centrifuge 67 to which the mixture is delivered through a conduit 68. This centrifuge separates the clay and acid liquor, delivering the clay through a conduit 69 and the acid liquor through a pipe 70. The clay passing through the conduit 69 has a liquid content of less than 15%. Since it is impossible to remove all traces of the acid liquor and the impurities which are carried in it, it is necessary to further wash the clay. The clay is delivered by the conduit 69 to an agitator 71 having an agitating means 72 which thoroughly mixes the clay with hot softened water introduced into the agitator 71 by means of a pipe 73. The clay is quite thoroughly washed by the hot softened water and the acid liquor in greatly diluted.

This mixture is delivered through a conduit 74 by means of a pump 75 to an apparatus for finally washing it. This apparatus consists of a series of Oliver filters 77, each of which is substantially the same as the filters 28 and 41, having a tank 78, a drum 79, a scraper 80, and a pipe 81 for delivering hot softened water to the cake formed on the drum. Placed between the filters 77 are agitators 82 having an agitating means 83 and pipes 84 for delivering hot softened water thereto. The mixture passes from the agitator 71 into the first filter 77 where it is formed in a cake on the drum 79 and dewatered by the suction in the drum. At the upper part of the drum hot softened water is sprayed onto the cake, which water replaces any moisture which was in it. The dry cake is removed from the right part of the drum by the scraper 80 and passes into the first agitator 82 where the clay is mixed with hot softened water. The mixture of clay and hot softened water, after a certain period of agitation, is delivered to the second filter 77 where it is again filtered. This action is repeated until the clay passes from the last filter 77 to a drier 86. When this point of the process has been reached, the raw clay has been converted into an activated adsorbent mineral and has desirable purifying qualities, all of the lime and other foreign matter having been removed therefrom, and the clay being combined with a proper amount of acid which gives it its desirable decolorizing qualities.

In the drier 86 which may be a rotary kiln, as shown, the clay is completely dried for subsequent sacking. The clay is delivered from the drier 86 to a cooler 87 in which the temperature of the clay is reduced from a high temperature to about atmospheric temperature. From the cooler 87 the clay is delivered by an elevator 88 to a storage bin 89, from which storage bin 89 the clay is delivered to a Raymond mill 90 in which final grinding takes place. The clay is withdrawn from the mill 90 by a blower 91 and delivered to a dust collector 92, the clay being separated from the air which carries it to the dust collector. From the collector 92 the clay drops to a sacking apparatus indicated by the numeral 93. This completes the entire process, commencing with the mining of a raw clay and terminating with the sacking of the activated adsorbent mineral.

In the foregoing description, as I have pointed out before, I have described the process in connection with certain standard apparatus without any intention of limiting myself. The various time elements and proportions of treating mediums for various grades of clay are determined more or less by experimenting first with a small quantity of clay. This knowledge is peculiarly within the province of those skilled in the art and therefore need not be pointed out herein. It will be seen that no set of temperatures or proportions would apply to all clays.

I have also described a complete process which produces a very superior activated adsorbent mineral from a very inferior raw clay. If a better grade of raw clay is to be treated, it is possible to dispense with some of the steps in this process; therefore, in the appended claims various phases of the process will be claimed individually and separately.

As an example, if a clay is found having no lime content or an exceedingly small lime content, the brine solution treatment may be eliminated. In some instances the clay is of such a nature that the drying of it to remove the water may be dispensed with.

The very important features of the invention reside in the means for removing the lime or lime salts from the clay, the particular manner in acid-treating the clay, and the abrupt stopping of the acid action after the acid treatment has been finished. The method by which the clay is washed at certain times during the process and the use of softened water or lime-free water are very important to the invention.

I claim as my invention:

1. A method of preparing an activated adsorbent clay comprising: subjecting the raw clay to the action of the atmosphere; treating said clay with sulphuric acid to render soluble certain impurities thereof; and washing said clay with softened water to remove said impurities and any uncombined acid.

2. A method of preparing an activated adsorbent clay comprising: subjecting the raw clay to the action of the atmosphere; treating said clay with a sodium chloride solution to remove certain impurities therefrom and then substantially removing the water and substances dissolved therein.

3. A method of preparing an activated adsorbent clay comprising: finely dividing said raw clay; treating said clay with a sodium chloride solution to remove alkali earth metal compounds therefrom and then substantially removing the water and substances dissolved therein.

4. A method of preparing an activated adsorbent clay comprising: subjecting the raw clay to the action of the atmosphere; heating said clay to remove largely the water of crystallization; treating said clay with a sodium chloride solution to remove certain impurities therefrom and then substantially removing the water and substances dissolved therein.

5. A method of preparing an activated adsorbent clay comprising: finely dividing said raw clay; heating said clay to remove largely the water of crystallization; treating said mineral with a sodium chloride solution to remove certain impurities therefrom and then substantially removing the water and substances dissolved therein.

6. A method of preparing an activated adsorbent clay comprising: treating the finely divided clay with a sodium chloride solution; separating said sodium chloride solution from said clay; and treating said clay with sulphuric acid.

7. A method of preparing an activated adsorbent clay comprising: removing the water content from the finely divided clay; treating the finely divided clay with a sodium chloride solution; separating said sodium chloride solution from said clay; and treating said mineral with sulphuric acid.

8. A method of preparing an activated adsorbent clay comprising: treating the finely divided clay with a sodium chloride solution; treating said clay with strong sulphuric acid; and immediately thereafter stopping the action of said sulphuric acid by diluting said acid.

9. A method of preparing an activiated adsorbent clay comprising: removing the water content from the finely divided clay; treating the finely divided clay with a sodium chloride solution; separating said sodium chloride solution from said clay; treating said clay with sulphuric acid; and immediately thereafter stopping the action of said sulphuric acid.

10. A method of preparing an activated adsorbent clay comprising: treating the finely divided clay with a sodium chloride solution; then removing said solution; treating said clay with strong sulphuric acid; and immediately thereafter treating said clay with softened water to stop the action of said sulphuric acid.

11. A method of preparing an activated adsorbent clay comprising: treating the finely divided clay with a salt solution; separating said salt solution from said clay; treating said clay with sulphuric acid; and immediately thereafter treating said clay with softened water for stopping the action of said sulphuric acid.

12. A method of preparing an activated adsorbent clay comprising: treating the finely divided clay with a sodium chloride solution; treating said clay with sulphuric acid; and immediately thereafter treating said clay with carbon dioxide and water free from the bases which it is desired to eliminate from the clay for stopping the action of said sulphuric acid.

13. A method of preparing an activated adsorbent clay comprising: treating the finely divided clay with a sodium chloride solution; separating said sodium chloride solution from said clay; treating said clay with sulphuric acid; and immediately thereafter treating said clay with softened water and carbon dioxide for stopping the action of said sulphuric acid.

14. A method of preparing an activated adsorbent clay which comprises: treating the raw finely divided clay with sulphuric acid; diluting the mixture of clay and sulphuric acid with softened water; and boiling and agitating the resulting mixture.

15. A method of preparing an activated clay which comprises: heating a raw clay to a temperature in excess of the boiling point of water but below the sintering point of said clay for a sufficient period to thoroughly dry the clay; treating the dry clay with a sodium chloride solution; removing the major part of said solution; treating the heated clay with sulphuric acid; and washing the clay to remove water soluble matter therefrom.

16. A method of preparing an activated adsorbent clay which comprises: treating the raw finely divided clay with a sodium chloride solution; then thickening the clay and treating it with a strong sulphuric acid solution; diluting the mixture of clay and sulphuric acid with softened water and carbon dioxide; and boiling and agitating the resulting mixture.

17. A method of preparing an activated clay which comprises: treating finely divided clay with sulphuric acid and washing said treated clay with water charged with carbon dioxide.

18. A method of improving the quality of an activated clay which comprises: treating the clay with sulphuric acid; arresting said treatment by vigorous agitation with hot water which is free from lime salts; and removing certain undesirable constituents of said clay by washing with water containing carbon dioxide.

19. A method of preparing an activated adsorbent earth comprising: dividing the raw earth into lumps of walnut size or smaller; exposing them to the weathering action of the sun and open atmosphere for thirty days or longer; then treating said earth with sulphuric acid to change the microstructure thereof and to render soluble certain bases therein; and then washing said treated earth with water sufficiently to remove substantially entirely said solubilized bases and any uncombined acid.

20. A method of preparing an activated clay adsorbent which comprises dividing the raw clay into lumps of walnut size or smaller; subjecting the clay in such a condition to the action of the sun and open atmosphere for not less than thirty days; then treating said clay with sulphuric acid to render soluble certain bases therein and to change the microstructure of the clay; and then washing said mineral with water substantially free from the bases which it is desired to eliminate from the clay to remove said bases and any uncombined acid.

In testimony whereof, I have hereunto set my hand at Chicago, Illinois, this 23d day of August, 1927.

WALTER S. BAYLIS.

CERTIFICATE OF CORRECTION.

Patent No. 1,818,453.                             Granted August 11, 1931, to

WALTER S. BAYLIS.

It is hereby certified that error appears in the printed specification of the above numbered patent requiring correction as follows: Page 4, line 92, claim 5, and line 108, claim 7, for the word "mineral" read clay; and that the said Letters Patent should be read with these corrections therein that the same may conform to the record of the case in the Patent Office.

Signed and sealed this 22nd day of September, A. D. 1931.

M. J. Moore,
Acting Commissioner of Patents.

(Seal)